United States Patent Office.

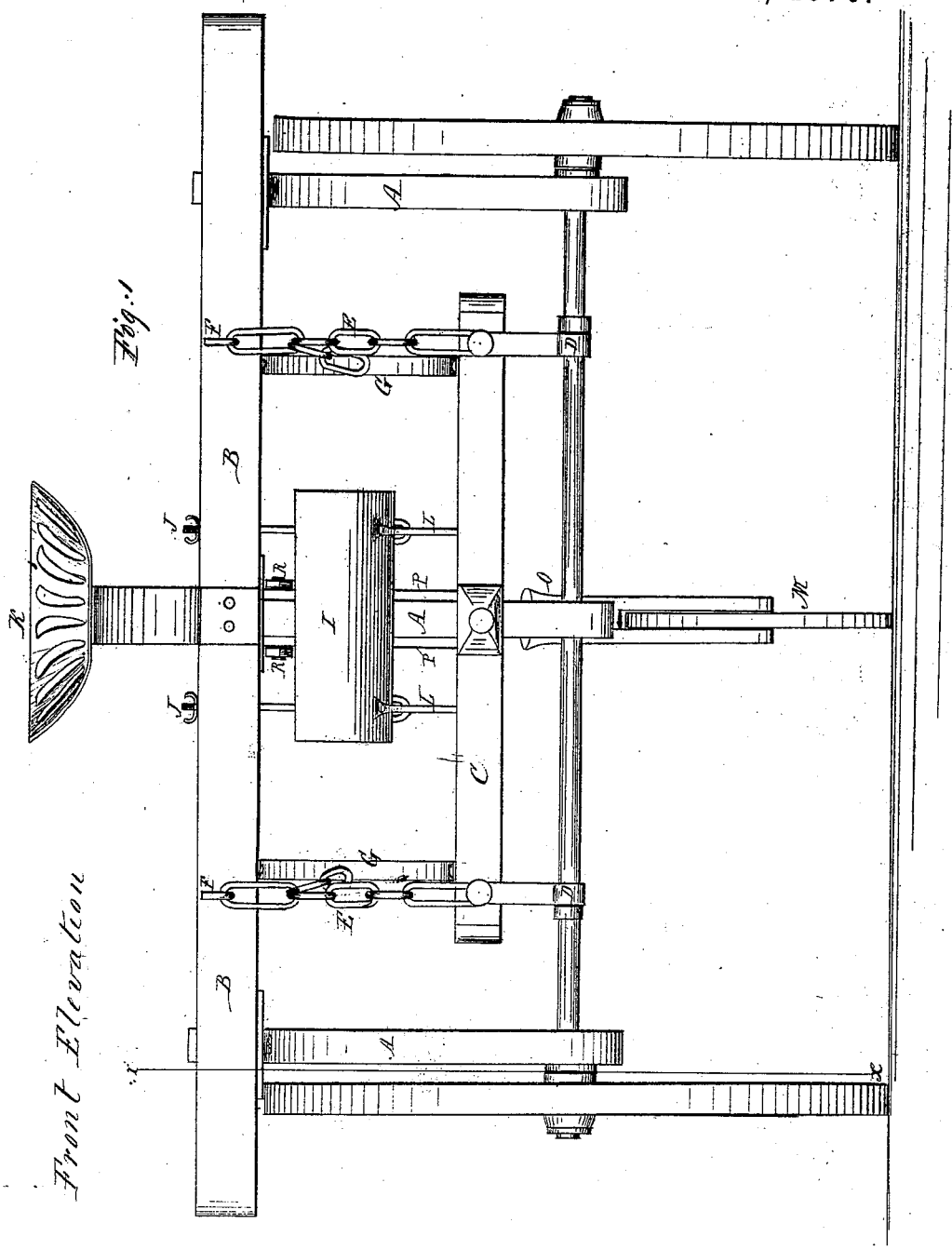

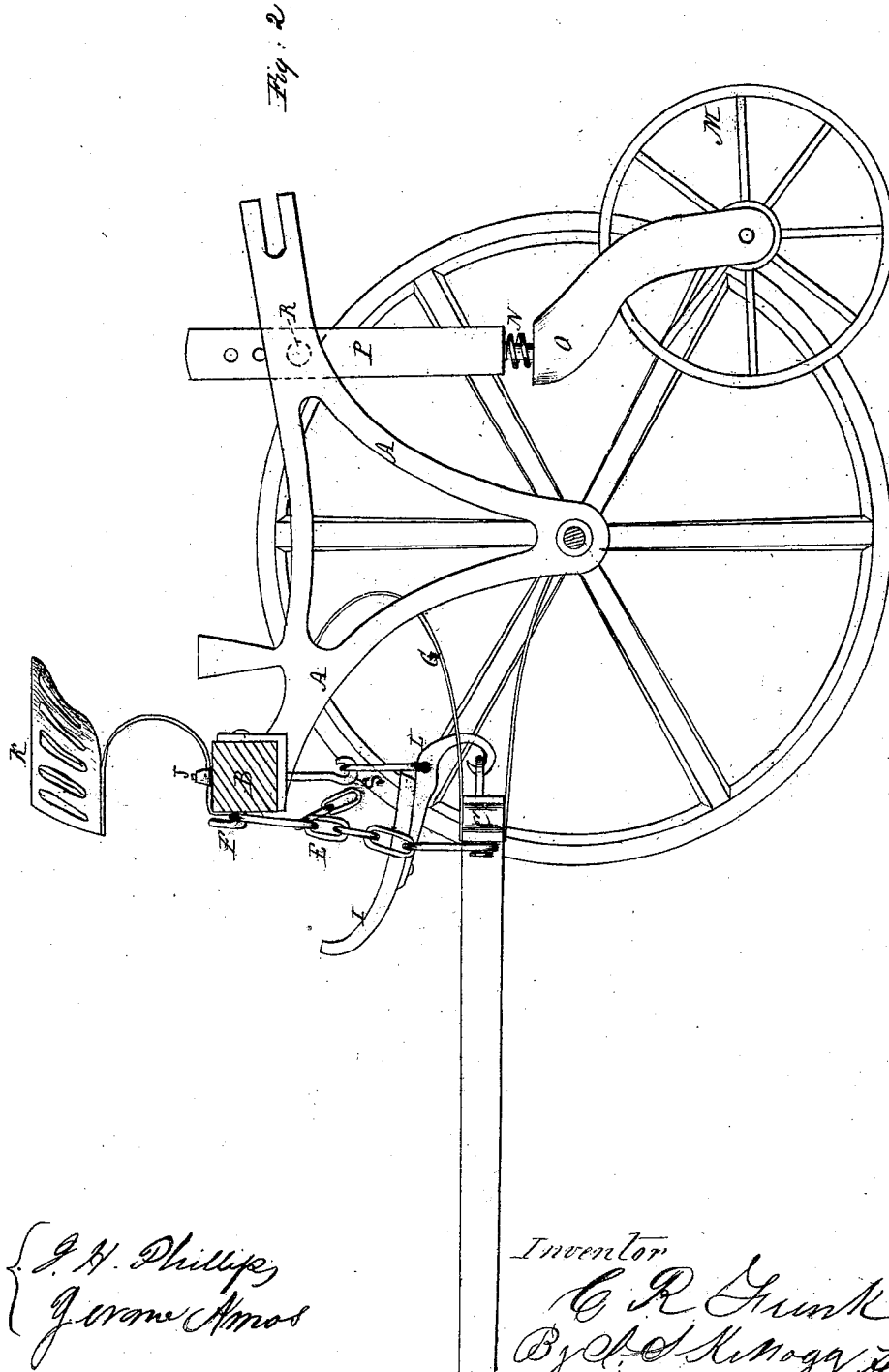

C. R. FRINK, OF NORWICH, NEW YORK.

Letters Patent No. 98,486, dated January 4, 1870.

IMPROVEMENT IN HAY-SPREADERS.

The Schedule referred to in these Letters Patent and making part of the same.

Be it known that I, C. R. FRINK, of Norwich, Chenango county, New York, have made the following Improvement in Hay-Spreaders.

This improvement consists in attaching the pole or thill-bar C direct to the axle of the machine, with hinge-joints D D, in such a manner that the end of the pole or thills can be raised or lowered like a carriage-pole, and the points of the fork-teeth also be vertically adjusted.

The pole or thill-bar C is placed beneath the head-bar B, so that they can be connected by chains and springs.

The chains E E are bolted to the pole-bar C, and attached to the head-bar B by hooks, in such a manner that the chain can be taken up or let out, for the purpose of adjusting the forks to the surface of the ground, and also regulating the height of the pole or thills to the team.

The springs G G are placed between the head-bar B and pole or thill-bar, for the purpose of retaining the head-bar in its place when relieved of the lever-pressure.

The lever L is connected to the head-bar, and to the pole or thill-bar, by link S and hook J, in such a manner that the lever can be adjusted and operated by the driver's feet. By pressing on the foot-board I or lever, the head-bar B will be drawn down toward the pole or thill-bar, thereby raising the forks from the surface of the ground, while the machine is in gear, a motion enabling the forks to pass over obstructions, without throwing the machine out of gear, thus making a machine that is flexible to the surface of the ground, and also under the control of the driver.

I extend the metallic buckets A A forward of the centre of the axle of the machine, for the purpose of supporting the head-bar B, and also to give a balance-movement to the machine.

The seat K is attached to the centre of head-bar, so that the weight of the driver will assist in raising the forks from the surface of the ground, with the lever I.

Having explained the improvements of my machine,

What I claim, is—

The combination of the main frame A with springs G, foot-lever I L, chains E, hooks F, links S, hooks J, and bars B and C, the whole arranged and operating substantially as described and set forth.

This specification signed and witnessed, this 8th day of March, 1869.

C. R. FRINK.

Witnesses:
C. A. COLLINS,
DAVID H. KNAPP.